United States Patent Office 2,912,263
Patented Nov. 10, 1959

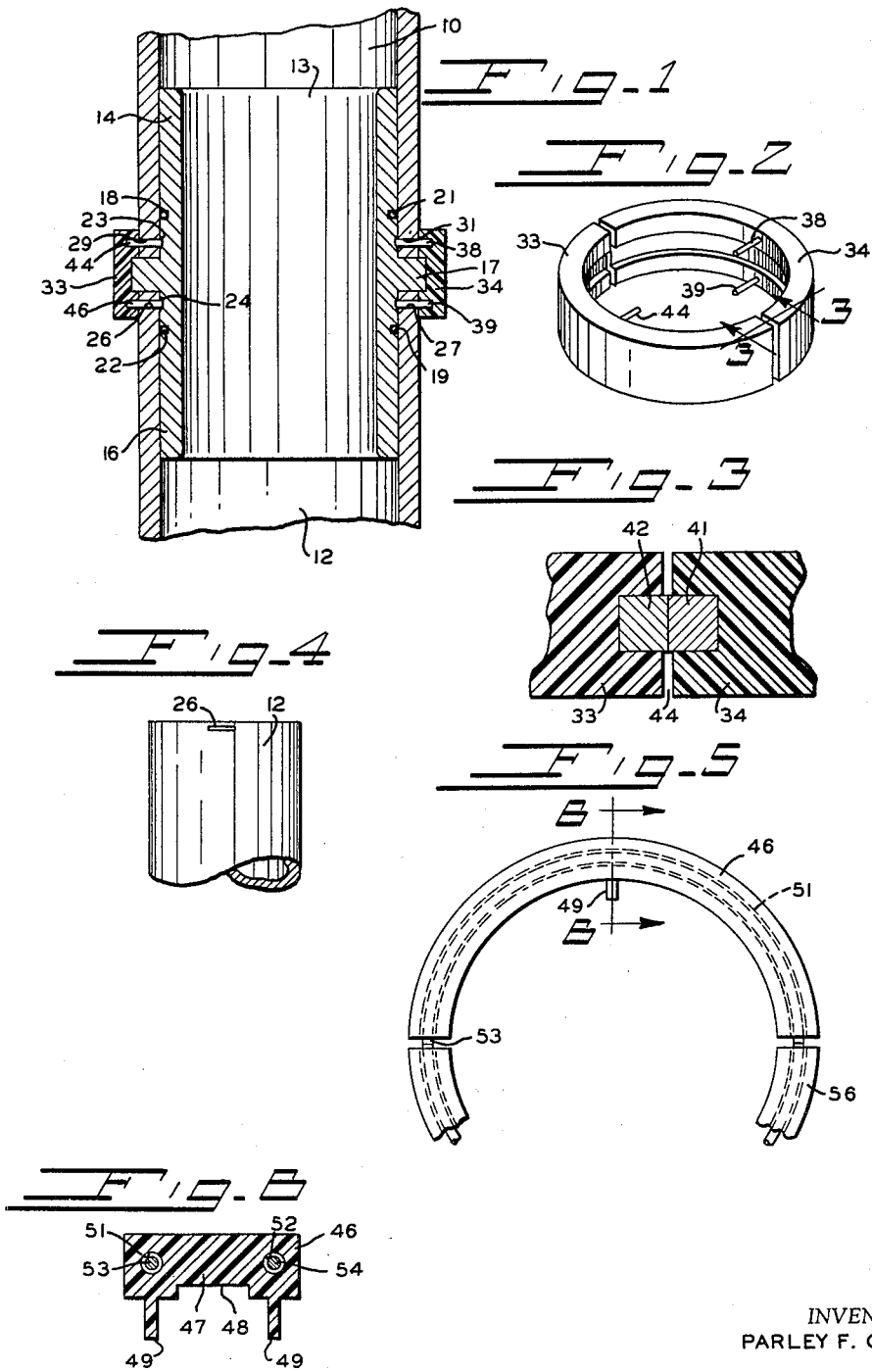

2,912,263

INTERNAL SLEEVE TYPE PIPE COUPLING WITH MAGNETICALLY SECURED EXTERNAL SLEEVE MEANS

Parley F. Christy, New Vienna, Ohio

Application November 1, 1956, Serial No. 619,707

1 Claim. (Cl. 285—371)

This invention relates to a sanitary coupling between two lengths of pipe or the like.

In dairies and the like, pipes must be disassembled periodically to permit a thorough cleaning thereof. An object of this invention is to provide a pipe coupling for use in a dairy or the like which can be readily and quickly disassembled for cleaning and thereafter be reassembled.

A further object of this invention is to provide a pipe coupling of the type in which pipes and clamp members are releasably held together by magnetic elements at the ends thereof which can quickly be released to permit separation and cleaning of the ends of the pipes.

A still further object of this invention is to provide a coupling in which pipe engaging elements are carried by a pair of partial or half-ring elements, the half-ring elements being held together by magnets at the ends thereof.

The above and other objects and features of the invention will be apparent to those skilled in the art to which this invention pertains from the following detailed description and the drawing, in which:

Figure 1 is a view in transverse section of a pipe coupling constructed in accordance with an embodiment of this invention;

Fig. 2 is a perspective view of a pair of clamping members which form a portion of the device, the clamping members being removed from the pipes;

Fig. 3 is a view in section taken on a line 3—3 in Fig. 2;

Fig. 4 is a fragmentary plan view showing one end of one of the pipes removed from the coupling;

Fig. 5 is a plan view of a clamping member of a coupling constructed in accordance with another embodiment of this invention and a portion of a second member; and Fig. 6 is a view in section, taken on the line 6—6 of Fig. 5.

In the following detailed description, and the drawing, like reference characters indicate like parts. In Fig. 1 are shown ends of two lengths of pipe 10 and 12. The lengths of pipe may be formed of stainless steel, or other metal or material suitable for use in piping of a dairy, or in other food processing industries, or the like. A tubular coupling member 13 is received inside the ends of the lengths of pipe 10 and 12. The tubular member 13 has portions indicated at 14 and 16 which are received inside the ends of the pipes 10 and 12, respectively. Between the portions 14 and 16, the tubular member is provided with an annular boss 17 which projects outwardly between the ends of the lengths of pipe, and the ends of the lengths of pipe substantially abut the boss 17. The portions 14 and 16 of the tubular member are provided with grooves 18 and 19 in which sealing gaskets or O-rings 21 and 22 are received, respectively. In addition, annular grooves 23 and 24 are formed in the outer face of the tubular member adjacent but spaced from the boss.

As shown in Figs. 1 and 4, the end of the pipe 12 is provided with slots 26 and 27 which extend circumferentially thereof. When the pipe coupling is assembled, the slots 26 and 27 are aligned with the groove 25 in the tubular member 13. Similarly, the length of pipe 10 is provided with slots 29 and 31 (Fig. 1) which register with the groove 23.

The tubular member and the ends of the lengths of pipe telescope with relation to each other and are held in assembled relation by means of half-ring or clamping segments 33 and 34. The clamping segments 33 and 34 are similar in construction, and only the segment 34 will be described in detail. The segment 34 has a body 36 of substantially half-circular channel shape. The body is adapted to fit over a portion of the boss 17 and to grip the boss. The body may be formed of appropriate synthetic plastic material. Pin members 38 and 39 are molded in the plastic body, and extend radially inwardly thereof. The pin members may be formed of stainless steel or the like. When segment 34 is mounted on the boss of the tubular member, the pins 38 and 39 extend through the slots 27 and 31 and the inner ends of the pins are received in the grooves 23 and 24. At the ends of the segment 34 are mounted permanent magnets 41, only one of which is shown. Similarly, the segment 33 carries permanent magnets 42, only one of which is shown. When the clamping segments are mounted in place, the magnets engage to hold the clamping segments in place. The segment 33 carries pins 44 and 46 which are received in the slots 26 and 29, respectively.

As shown in Fig. 3, a space 44 is provided between the ends of the segments 33 and 44, so that, if necessary, the end of a tool such as a screw driver (not shown), may be inserted therebetween, so that the ends of the clamping segments may readily be separated.

Once the clamping segments have been released, the ends of the pipe may be readily withdrawn from the tubular member and the O-rings 21 and 22 may be removed so that the parts of the coupling can be cleaned.

In Figs. 5 and 6 is illustrated one segment 46 of a clamping ring for a coupling constructed in accordance with another embodiment of this invention. The segment 46 includes a body 47 which is substantially half-circular in general shape. The body is molded of appropriate plastic material, or a laminated plastic material, such as a glass fibre reinforced phenol formaldehyde resin. A groove 48 therein is adapted to fit over the base of the tubular member. A pair of pins 49 are molded integrally with the body. The body is provided with half-circular openings 51 and 52 which extend the length of the body. Half-circular magnets 53 and 54 are loosely received in the openings 53 and 54, respectively. The segment 46 co-operates with a second similar segment 56 to form a complete ring which can be mounted in overlying relation to the ends of the pipes 10 and 12 with the groove 48 receiving the boss of the tubular member.

The couplings illustrated in the drawing and described above are subject to structural modification without departing from the spirit and scope of the appended claim.

Having described my invention, what I claim as new and desire to secure by Letters Patent is:

A sanitary releasable coupling for a pair of pipes which comprises a tubular member having end portions received inside end portions of the pipes, there being slots in the end portions of the pipes adjacent and spaced from the ends of the pipes and opposite the tubular member, sealing gasket rings between the tubular member and the pipes, the gasket rings being mounted in annular grooves located between the slots and the respective ends of the tubular member, the tubular member being continuous and imperforate between the gaskets, the tubular member having a rib extending between the end portions of the pipes and outwardly of the outer faces of the pipes, a plurality of elongated segmental clamping members surrounding the ends of the pipes, each of said segmental clamping members having a groove therein overlying and embracing the rib of the tubular member, magnets embedded in the ends of the clamping members, said magnets having end portions protruding from the ends of the clamping members for engagement to hold the clamping members in assembly to form a ring, and inwardly directed pin members fixedly carried by the clamping members and removably received in the slots of the pipes for holding the pipes and the tubular member in assembled relation.

References Cited in the file of this patent

UNITED STATES PATENTS

| | | |
|---|---|---|
| 1,756,094 | McGuirk | Apr. 29, 1930 |
| 1,782,484 | Spencer | Nov. 25, 1930 |
| 2,120,184 | Mojonnier | June 7, 1938 |
| 2,678,228 | Gerhardt | May 11, 1954 |

FOREIGN PATENTS

| | | |
|---|---|---|
| 743,967 | France | Jan. 16, 1933 |
| 411,821 | Great Britain | June 12, 1934 |
| 622,632 | Great Britain | May 4, 1949 |